Sept. 18, 1923.
L. J. WEINSTEIN
DENTAL INSTRUMENT
Filed June 10, 1922
1,468,063
2 Sheets-Sheet 1
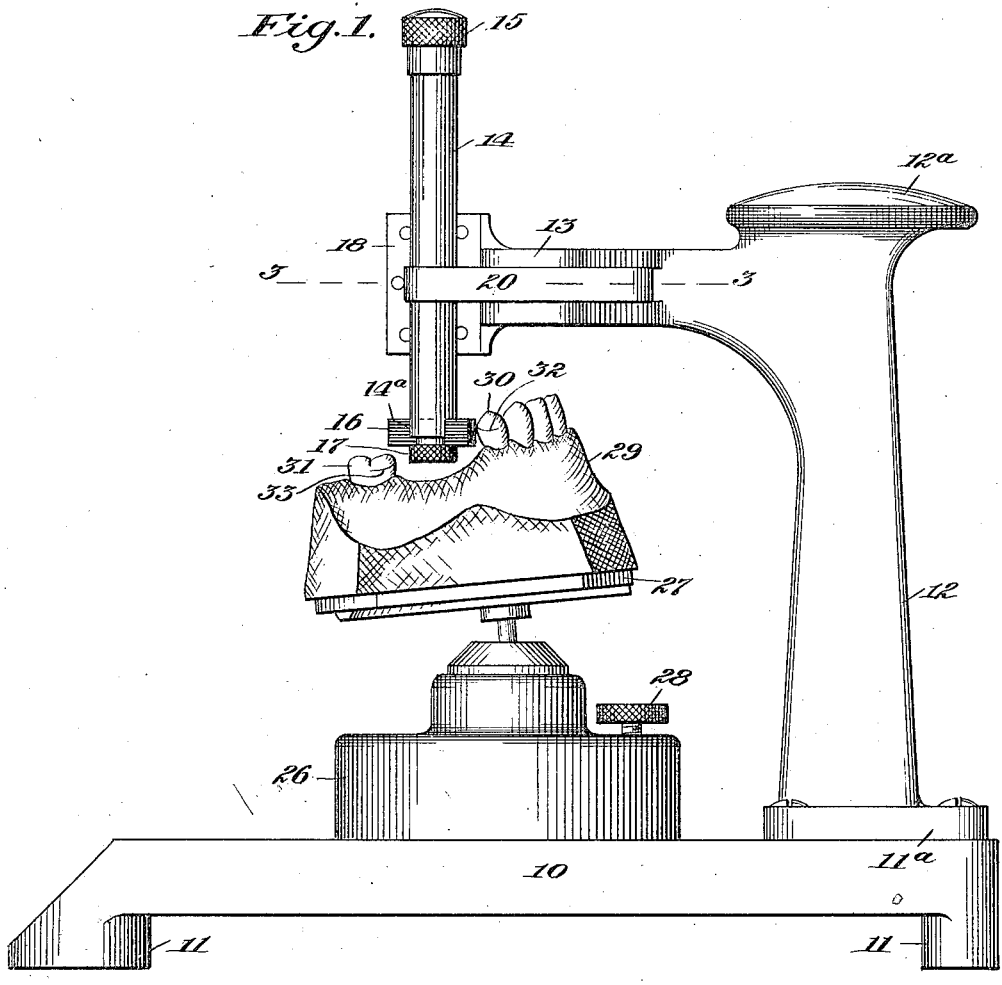
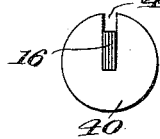
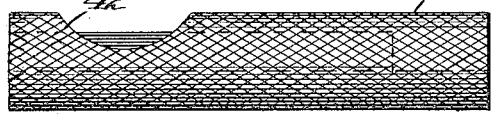
Inventor:
Louis J. Weinstein,
by Wolfe & Moses
Att'ys.

Sept. 18, 1923.

L. J. WEINSTEIN

DENTAL INSTRUMENT

Filed June 10, 1922

Inventor:
Louis J. Weinstein,
by Wolfe Thuases
Attys.

Patented Sept. 18, 1923.

1,468,063

UNITED STATES PATENT OFFICE.

LOUIS J. WEINSTEIN, OF NEW YORK, N. Y.

DENTAL INSTRUMENT.

Application filed June 16, 1922. Serial No. 567,482.

*To all whom it may concern:*

Be it known that I, LOUIS J. WEINSTEIN, a citizen of the United States, residing at New York, in the county of New York and State of New York, have invented certain new and useful Improvements in Dental Instruments, of which the following is a specification.

The invention relates to a dental appliance and specifically to an instrument by means of which certain types of artificial denture attachments may be rapidly and accurately charted and attached to the denture.

The new appliance is intended particularly for charting the positions of clasps used as attachments for various types of removable dental or oral restorations, and principally in such cases in which the abutments, that is, the natural teeth to which the clasps are attached, are out of alignment.

In many cases in which an artificial denture is required, and particularly where the teeth to be replaced have been missing for a long time, the remaining teeth, used as supports for artificial dentures, tend to move from the conventional lines of the dental arch, the result being that the vertical axes of these abutments are considerably displaced with respect to each other. If, under these conditions, a denture is provided which is to be secured to the abutments by means of clasps or the like, it will be obvious that if these clasps are made for and fitted individually to each of the two, three or more abutments as closely and accurately as required, it will be impossible to insert the denture in position on the jaw by reason of the relative displacement of the abutments.

This condition is completely remedied by the use of the appliance forming the subject of the present invention, by means of which the positions of the clasps on the abutments are charted in parallel relation with each other at the proper angle at which the denture is to be inserted in position on the jaw, and regardless of the relative displacement of the vertical axes of said abutments.

The construction, operation and advantages of the new appliance are set forth hereinafter, with reference to the accompanying drawings which illustrate a practical embodiment of the invention by way of example of which the forms, dimensions and constructional details may be varied without exceeding the scope of the invention. On said drawings:

Fig. 1 is an elevation of the assembled apparatus.

Fig. 3 is a section on line 3—3 of Fig. 2.

Fig. 4 is an end elevation of the device for retaining the marking means while forming the straight edge thereof.

Figure 2:
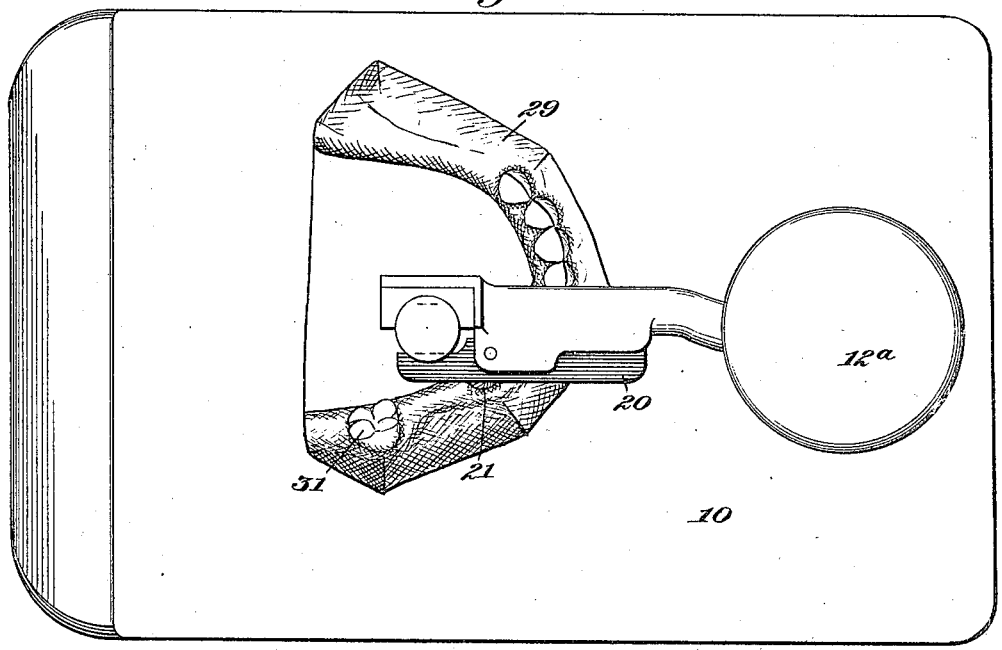
Fig. 2 is a top plan thereof.

Referring to said figures of the accompanying drawing, 10 represents a base, suitably supported as by feet 11, and on which is mounted in suitable manner, by screws or otherwise, as at 11$^a$, a support 12, which may be provided with an expanded portion 12$^a$ forming a hand rest, and having the transverse portion 13 extending therefrom. The free end of the latter is provided with a retaining or clamping device actuated by means of a spring and a set screw, in which retaining device is held a rotatable and vertically adjustable charting rod 14, one end of which is provided with a knurled head 15, the other end having a transverse slot 14$^a$ for the reception of a marking instrument 16, for example, lead, crayon or the like, which is of rectangular cross section; and the end of this bar 14 is threaded to receive a set screw 17 for retaining the lead 16 in adjusted position.

The retaining mechanism on the part 13 comprises the block 18, rigidly attached to or integral with said arm 13, and provided with a longitudinal angular groove 19 for the reception of the charting rod 14, and a clip 20, pivoted as at 21, the free end of which engages the rod 14 and is held in engagement therewith by means of the spiral spring 22 seated in the notches 23 and 24 of the members 13 and 20 respectively, said spring 22 tending to force the inner end of the clip 20 outwardly and thus to apply the outer end against the rod 14 in the angular groove 19. The rod 14 may be adjusted to the desired height by means of the spring actuated clip 20, and when adjusted in proper position, may be retained in such adjusted position by means of the set screw 25 passing through a perforation 26 of the arm 13 and applied against the inner end of the clip 20, whereby the outer end thereof is held in forcible engagement with rod 14.

A model support 26, freely movable on the surface of the base plate 10, is provided with a model plate 27, which is adjustable at substantially any suitable angle with respect to the support 26 and the base plate 10, by means of a universal or ball and socket joint (not shown) which connects the members 26 and 27; and the plate 27 may be retained in adjusted position by means of the set screw 28 provided on the model support and engaging the ball and socket joint. A model 29 (in the present case one of a lower jaw) of plaster of Paris material, metal or the like, for example, is mounted on the plate 27 in the manner and for the purpose hereinafter described.

The clasp charting technique is as follows:

If an artificial denture such, for example, as that illustrated, is to be constructed, the model 29 having the abutments 30 and 31, for example, is temporarily attached to the model plate 27 by means of melted wax, shellac or the like, said plate 27 being provided with a corrugated or roughened surface for retaining the adhesive wax, etc. and the base of the model 29 may also be correspondingly roughened for this purpose.

Figure 6:
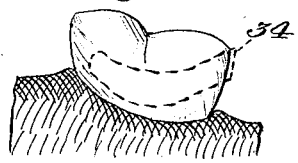
Figs. 6, 7 and 8 show various abutments in elevation, illustrating the method of charting the positions for the clasps.
Figure 7:
Figure 8:
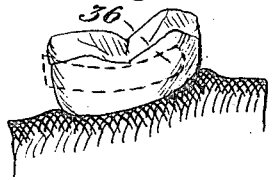

Referring to Fig. 1, it will be noted that the abutment 31 is substantially out of alignment with the remaining teeth, and that therefore if clasp attachments were made separately for and accurately fitted to each abutment in the usual manner, it would be impossible to insert the denture in position on the jaw. By the use of the instrument forming the subject of the present invention the position of each clasp is charted simultaneously and in parallel relation to the other or others, by adjusting the model plate 27 so that the model 29 thereon will be at the angle considered most suitable and convenient for insertion of the denture on the jaw, and adjusting the charting bar 14 in height so as to contact with the extreme convexities of the abutments, and then moving the support 26 about on the base 10 so that all portions of the extreme convexities of the abutments 30, 31, etc. come in contact with the longitudinal straight marking edge of the lead 16 or the like attached in the charting rod 14. This moving contact of the abutments against the straight edge of the marking lead will mark the extreme convex portions of each abutment and accurately indicate the positions of the clasps in perfect relative parallel alignment, as by the line 32 on abutment 30 and line 33 on abutment 31, for example (Fig. 1), whereupon the general form of the clasp can be indicated as shown by the dotted lines 34, 35, 36, Figs. 6, 7, 8.

The positions of the clasps having been charted and the forms indicated as set forth above, the clasps are modeled in wax or the like and cast or otherwise formed in the usual manner.

The model 29 may be removed from the plate 27 by slightly heating the latter, thereby softening the wax, shellac or other adhesive substance connecting these members.

The clasps are then mounted on the same or another model and the denture completed in the usual manner. When the denture with the clasps is completed, each clasp will be parallel with respect to the other or others at the proper angle of insertion, and the denture may be positioned with facility and accuracy.

Figure 5:
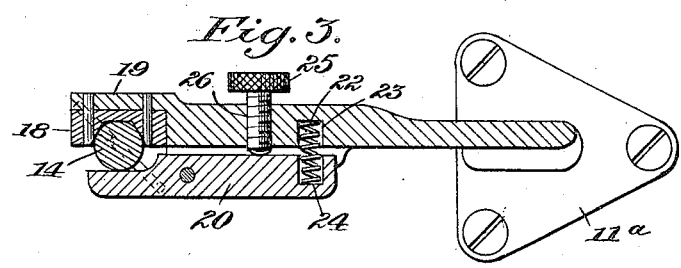
Fig. 5 is a side elevation of the retaining device.

It is absolutely necessary that the marking edge of the lead, crayon or the like 16 be perfectly straight; and Figs. 4 and 5 illustrate a device in which the lead marking means 16 is retained while the straight edge is formed thereon. A knurled bar 40, of hardened steel or the like, is provided with a longitudinal groove 41, in which the lead 16 fits accurately, and is held in said groove 41 by pressure of the operator's thumb, for example, in the notch 42, the straight edge of the lead 16 then being formed with a file or the like at the end of the bar 40, as shown on Fig. 4.

As stated above, the forms, dimensions and details of construction may be modified without departing from the scope of the invention. For example, the supporting member 12, with the transverse arm 13 and its pertinent mechanism, instead of being permanently or otherwise attached to the base 10, may be supported separately. The appliance may also be used without the model support 26 in such cases where it may not be necessary to adjust the model at a definite angle of insertion, for the same or other purpose, in which case the model may be moved freely on the base 10.

What I claim is:

A dental instrument comprising in combination a base member; a rigid upright member mounted at an end of said base member, an arm integral with said upright member and extending parallel with and above said base member, a spring and screw actuated clamping device provided at the free end of said arm, a hollow rod engaged and vertically and rotatably adjustable in said clamping device, a transverse slot provided in the lower end of said rod, the dimensions of said slot being modified by means of an adjusting screw threaded in the lower end of said rod, a straight edge marking means extending longitudinally through said slot and retained in position by said screw, and a universally adjustable model support having a dental model thereon separate from and freely movable on said base member about and in contact with said marking means, whereby the extreme convexities of the teeth on said dental model are charted.

In testimony whereof I affix my signature.

LOUIS J. WEINSTEIN.